Figure 4:
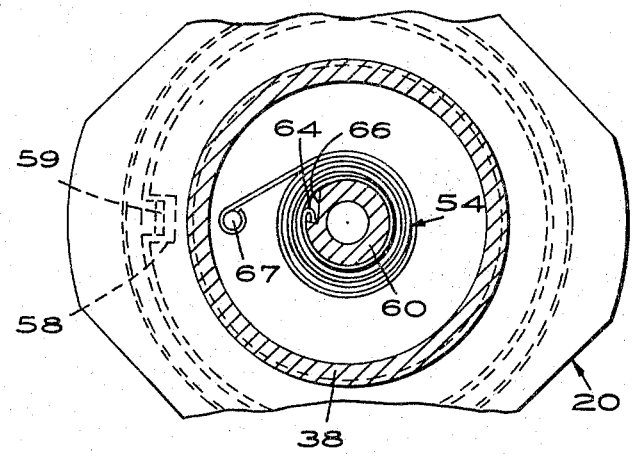

June 13, 1967  W. C. WEHNER  3,325,197
BALL JOINT
Filed June 12, 1964  3 Sheets-Sheet 1
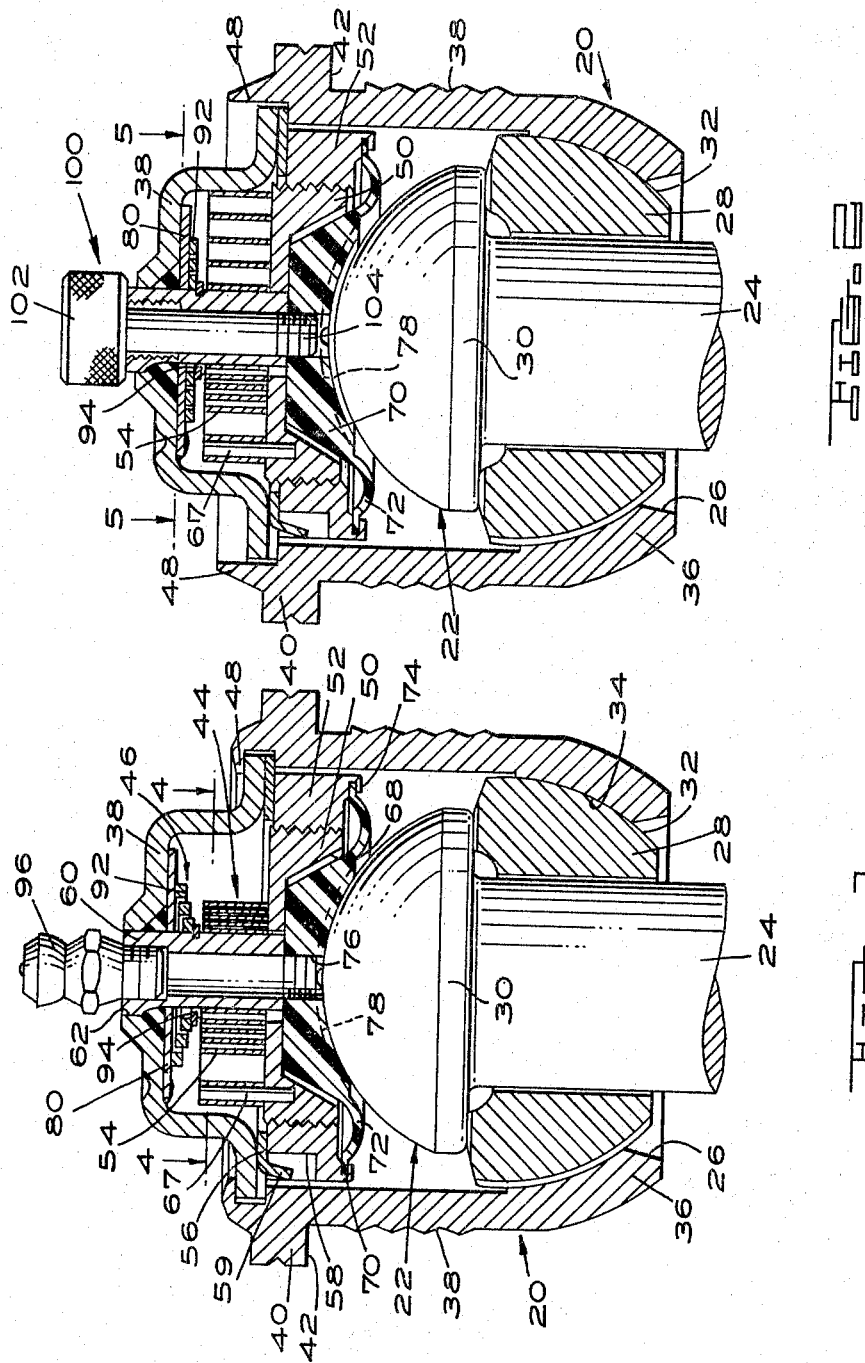
INVENTOR.
WILLIAM C. WEHNER
BY
*Burton & Parker*
ATTORNEYS June 13, 1967 W. C. WEHNER 3,325,197
BALL JOINT Filed June 12, 1964 3 Sheets-Sheet 2

INVENTOR.
WILLIAM C. WEHNER
BY
*Burton & Parker*
ATTORNEYS

June 13, 1967   W. C. WEHNER   3,325,197
BALL JOINT

Filed June 12, 1964   3 Sheets-Sheet 3

INVENTOR.
WILLIAM C. WEHNER
BY
*Burton & Parker*
ATTORNEYS 3,325,197
BALL JOINT
William C. Wehner, Detroit, Mich., assignor to Moog Industries, Inc., St. Louis, Mo., a corporation of Missouri
Filed June 12, 1964, Ser. No. 374,711
3 Claims. (Cl. 287—90)

This invention relates to ball joints, having particular, though not exclusive, utility in the field of automotive steerable wheel suspension systems.

A serious problem in automotive ball joint designs alluded to in my copending application, Ser. No. 349,114 filed Mar. 3, 1964, has been the wear of bearing surfaces between the ball head and its seat. In the majority of automotive ball joints in use today the ball is held against its seat by a compression spring. As normal wear occurs the spring elongates and progressively loses its effectiveness in holding the ball and seat surfaces together during momentary reverse loading. Inability of such surfaces to remain together during reverse loadings leads rapidly to destruction of the joint and gives rise to an extremely hazardous condition in an environmental automotive steering or suspension system.

To compensate for normal wear of ball and seat bearing surfaces Patent No. 2,954,993 suggested that provision be made for manually readjusting the joints periodically, and a number of other patents, for example Australian Patent No. 145,457 suggests designs that are intended to be self-adjusting.

The manually adjustable design above noted requires regular periodic inspection, and the adjustment must be carried out carefully by a skilled mechanic to avoid overtightening that will unduly overload the critical bearing surfaces. The patented self-adjusting joints, because of their design, would only be self-adjusting for a limited time and no provision is made for readily restoring their self-compensating character, and perhaps because of this or a variety of other reason they have never enjoyed any appreciable commercial success.

An object of this invention is the provision of a ball joint in which wear of critical bearing surfaces is not only automatically compensated for over long periods of usage but which may also be readily manually adjusted to restore the self-compensating feature of the joint to full effectiveness should the usage be unusually long or arduous. A concomitant object is the provision of a manually adjustable ball joint which need not be inspected with periodic regularity, and if manually adjusted such may be accomplished by relatively unskilled mechanics without danger of overloading critical bearing surfaces.

Another object of the invention is the provision of a self-adjusting ball joint having a spring-tensioned jackscrew unit for urging the ball continuously against its seat, and the joint, following assembly, may have the spring of the jackscrew unit wound into tension to energize the jackscrew unit.

Another object of the invention is the provision of a bearing pad having a peripheral lip seal to prevent entry of undesired material into the wear compensating mechanism.

Figure 3:
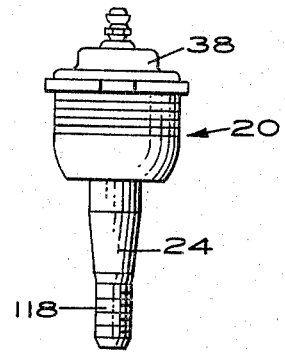
Figure 5:
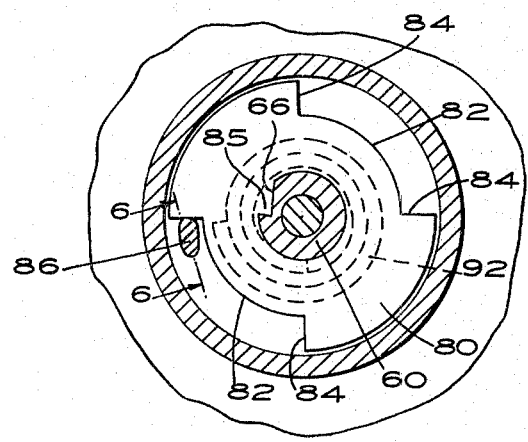
Figure 6:
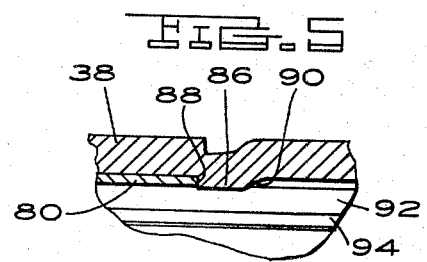
Figure 7:
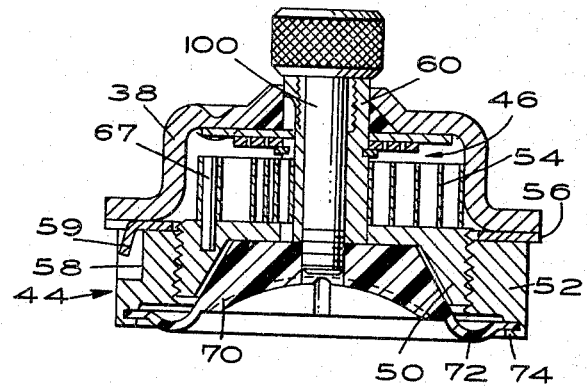
Figure 8:
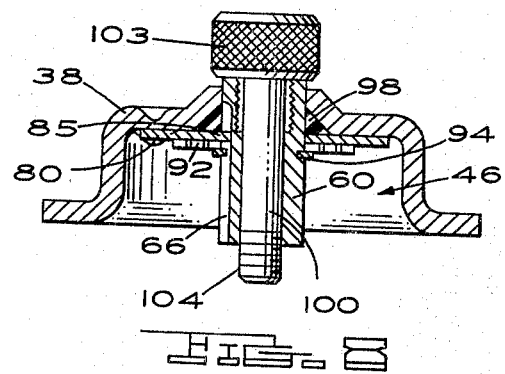
Figure 9:
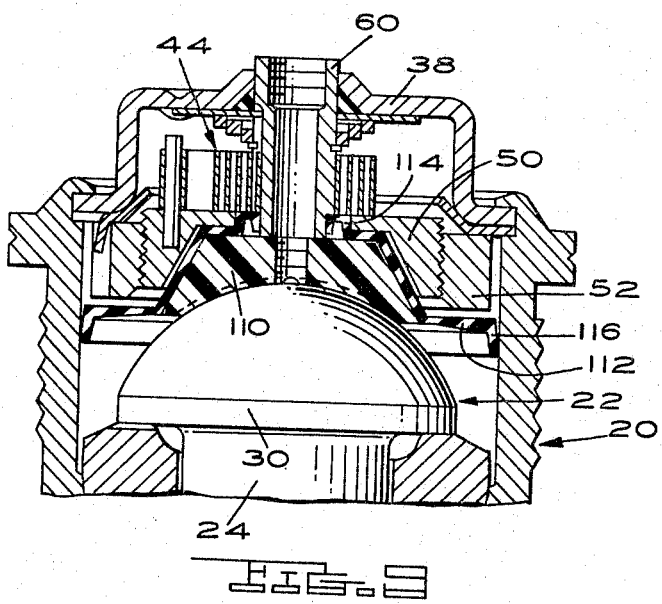

Other objects, advantages and meritorious features will more fully appear from the following specification, claims and accompanying drawings, wherein:

FIG. 1 is an enlarged sectional elevational view of a ball joint embodying my invention showing the joint ready for use;
FIG. 2 is a view similar to FIG. 1 showing the joint in one stage of assembly of the jackscrew unit within the housing;
FIG. 3 is a side elevation of the ball joint shown in FIG. 1;
FIG. 4 is a cross-sectional view taken along line 4—4 of FIG. 1;
FIG. 5 is a cross-sectional view taken along line 5—5 of FIG. 2;
FIG. 6 is a fragmentary cross-sectional view taken along line 6—6 of FIG. 5;
FIG. 7 is a cross-sectional elevational view of the jackscrew unit and manual adjusting mechanism ready for insertion in the ball joint housing;
FIG. 8 is a view similar to FIG. 7 with the jackscrew unit removed; and
FIG. 9 is a cross-sectional elevational view of a modified ball joint.

Throughout the following description it will be evident that certain of the structure is substantially the same as that used in conventional ball joints, and hence such items as fall into this category will be defined only with enough particularity to enable an understanding of the instant invention. Corresponding parts have been accorded similar reference numerals throughout.

In FIGS. 1 and 2 a conventional automotive ball joint housing or socket 20 is shown, with the ball stud member having a head 22 seated therein and a shank 24 extending outwardly through an opening 26 in the housing. A bearing member 28 comprising part of the ball head supports the enlarged head portion 30, and defines a spherical bearing surface 32 swivelly seating against the complementary housing bearing surface 34 formed by the inwardly directed portion 36. A cover plate or closure 38 closes the opposite end of housing 20.

Stud shank 24 projects out of housing 20 for connection to the automotive suspension system (not shown). Housing 20 may be externally threaded as at 38 for mounting in a part of the suspension system which moves relative to that part of the system coupled to shank 24, in which case housing flange 40 is shaped to engage a wrench or other tool for threadably tightening the parts together. Alternately the housing may be smooth for press fit assembly into the system, and in such instance, shoulder 42 serves to locate the housing during assembly. The jackscrew unit 44 and the take-up or rewind mechanism 46 forming a part of the invention are received through the open end of the housing and flange 48 is then spun over cover 38 to retain the parts within housing 20.

While the head 22 of the ball is normally seated against the bearing surface 34 and urged thereagainst by the weight of the automobile chassis acting through the suspension system (not shown), it is additionally held thereto ward by the jackscrew unit 44. Such comprises an externally threaded bearing screw or plug 50, an internally threaded member or nut 52 and stored energy means 54. The screw and nut may be formed of steel or the like of suitable rigidity and strength. A washer 56 is provided between cover 38 and nut 52, and the latter exhibits a cutout 58 into which an ear 59 of the washer is set to locate the washer on the nut. Plug 50 has a central aperture accommodating a hollow stem 60 which projects through an aperture 62 in the cover.

The stored energy means 54 is shown in the form of a flat spirally coiled spring having a plurality of turns encircling the stem 60 and having a hook-shaped inner end 64 (see FIG. 4) engaged within a longitudinal cutout 66 in stem 60. Plug 50 has a bore within which is pressed an anchor pin 67, and the outer end of the spring is connected thereto as shown. The face of plug 50 toward ball head 22 is provided with a truncated conical recess 68 within which is seated a bearing pad 70 slightly smaller than the recess to provide lateral space therebetween, which permits the pad to float or shift laterally slightly to take up any eccentricity between the parts. Pad 70 has a spherical bearing surface conforming to the spherical head on ball member 22 for engagement therewith, and defines a relatively thin-walled peripheral skirt portion 72 which extends outwardly into entrapping engagement within a slot 74 in nut 52. Pad 70 may be made out of any suitable moldable material such as Delrin, Teflon or the like, and the thin skirt section 72 is flexible to permit slight lateral movement of pad 70 in plug 50. The pad also is provided with internally threaded aperture 76 aligned with the stem 60 and a grease groove 78 more fully described herebelow. Skirt 72 prevents grease and other foreign matter from entering the portion of the housing carrying units 44 and 46, and thus serves as a seal to seal off the chamber.

FIGS. 5 and 6 show the mechanism 46 for winding up spring 54 about stem 60. A disc 80 is provided having cut away portions 82 to form shoulders 84, and also having a central aperture shaped to provide a tongue 85 fitting the slot 66 in stem 60 to prevent relative rotation therebetween. The cover 38 is punched inwardly to provide a projection 86 defining a shoulder 88 at one end and an inclined ramp 90 at the opposite end. Disc 80 is held against cover 38 by a conical spring 92 entrapped between the disc and a snap ring 94 disposed in a suitable groove on stem 60 (see FIG. 1). As can be seen from FIG. 5, as disc 80 is engaged on stem 60, the stem can be rotated in a clockwise direction, but when released, one of the shoulders 84 on disc 80 catches on shoulder 88 to prevent stem rotation in the opposite direction. The inner end of spring 54 is affixed to stem 60, so that rotation of stem 60 tightens the spring. As shown in FIG. 1, when the joint is completely assembled, a grease fitting 96 is threaded into stem 60, and by means of a wrench on the fitting 96, the stem may be rotated to tighten the spring.

In assembling the ball joint, FIG. 8 shows the first stage, wherein the stem 60 is inserted through cover 38 and a seal 98 pressed up into the cover around the stem. Disc 80 and spring 92 are then received over the stem and are retained by the snap ring 94. An assembly tool 100 having an enlarged head 103 and threaded shank 104 is then inserted through stem 60. Now turning to FIG. 7, the jackscrew unit 44 is preassembled by threading together the bearing screw 50 and the nut 52 and then engaging the outer end of the spring 54 on the pin 67 projecting from the screw 50. The peripheral lip 72 on bearing pad 70 having been secured within the nut by spinning over the depending wall portion to entrap the lip as shown at 74, the pad is secured within the assembly. Washer 56 is then located atop nut 52 with its projecting ear 59 engaged in cutout 58.

The unit 44 is then inserted up into the subassembly of FIG. 8 in position so that the inner end 64 of spring 54 seats within the cutout 66 in stem 60 (see FIG. 4), and the end of tool 100 is threaded into the bearing member 70. The jackscrew unit is held by the tool upwardly against cover 38 as in FIG. 7. With the adjustment mechanism so assembled, the entire unit is set into the end of the housing 20 as shown in FIG. 2, and the flange 48 is thereafter spun over to complete the assembly. FIG. 2 shows that during assembly the bearing pad 70 is held spaced from the complementary surface of the ball head 22, and thereafter when tool 100 is removed and spring 54 wound up, the rotation of screw 50 within nut 52 urges the bearing pad 70 against the ball head 22. Grease may then be introduced to the housing through fitting 96, stem 60, passage 76 and grease groove 78 in pad 70 to lubricate the bearing surfaces. While in many instances the introduction of grease into the chamber housing spring 54 may not be objectionable, there are some situations where it could cause problems, and the flange 72 on pad 70 effectively seals the chamber in the embodiment shown in FIG. 1.

In FIG. 9 there is shown a slightly modified construction wherein the bearing pad 70 of FIG. 1 has been replaced by a similar pad 110 of Delrin, Teflon or the like, and a separate sealing member 112 made of soft rubber or the like provides the seal. The screw 50 has a slightly larger aperture to accommodate the sealing lip 114 to seal around stem 60, while the periphery of member 112 has a lip seal 116 engaging the cylindrical wall of the housing 20. In other respects the ball joint is substantially similar to that previously described.

When the completely assembled ball joint is placed in service, with spring 54 wound up, wear between the various bearing surfaces of the joint will cause the spring to urge the screw 50 to rotate clockwise, forcing the pad 70 against ball head 22, thus keeping the joint "tight" at all times. When the spring has become unwound, it may be conveniently retightened to provide additional wear take-up merely by the rotation of the stem 60.

FIG. 3 shows a completely assembled ball joint 20 as defined herein ready for attachment to the automotive steerable wheel suspension system, and shows the ball stud shank 24 externally threaded as at 118 for connection to an internally threaded member.

It will be understood by those skilled in the art that the use of terms "ball joint," "ball stud," "ball head," etc. used hereinabove and in the claims, is intended as generic to joints having a stud provided with an at least partially spherical head as herein disclosed, and is not intended as limited to spherical "ball," or a stud having a spherical "ball" head.

What is claimed is:

1. A self-adjusting ball joint comprising: a housing having a socket therein provided with a ball stud head supporting seat, a ball stud having a ball head in the socket rockably nestled against said seat with a shank extending out of said socket, a wall of the socket spaced from the ball head and disposed on the opposite side thereof from said supporting seat, a self-energizing jackscrew unit disposed between and bearing against said ball head and said socket wall and including an internally threaded nut member bearing against the wall and threaded on an externally threaded screw member bearing against said ball head, a stem in the housing projecting out rotatably through said socket wall, a spiral spring wound upon itself in the socket between said unit and the socket wall connected at its outer end to said screw member for continuously rotatively urging such member in a direction pressing the ball head against its seat and connected at its inner end to the stem, and a ratchet assembly interposed between said socket wall and said stem permitting unidirectional rotation of said stem from outside the housing in a direction to increase the potential energy of the spring.

2. An automatically operable wear take-up unit for a ball joint in which the joint includes a housing having a bore with one open end to receive said unit and an opposite apertured end provided with a bearing for a stud head swivelly movable relative to the bearing comprising: an externally threaded bearing member having a bearing surface complementary to the stud head, a nut member threadedly mounted on the bearing member, a closure member adapted to be engaged in the open end of the housing, a stem projecting rotatably through the closure member, a drive spring engaged between said stem and said bearing member, ratchet means mounted on and operatively interconnecting said stem and closure member for permitting rotation of said stem with respect to said closure member in a direction tightening said drive spring while preventing rotation of said stem in the opposite direction, said stem and bearing member having axially aligned passageways therethrough, and a removable member insertable through said passageway means and engaging said bearing member to temporarily retain said wear take-up unit in predetermined assembled position until disposed in said housing bore.

3. The invention as defined in claim 2 characterized in that said externally threaded bearing member has its bearing surface complementary to the stud head formed as a separate bearing pad member laterally floatingly bearing against the bearing member on one side thereof and having a bearing surface conforming to and bearing against the stud head on the opposite side thereof.

References Cited

UNITED STATES PATENTS

| | | |
|---|---|---|
| 1,820,891 | 8/1931 | Spiller. |
| 1,926,487 | 9/1933 | Krumm _____ 287—90 |
| 2,102,268 | 12/1937 | Hoppenstand _____ 185—37 |
| 2,591,260 | 4/1952 | Hobbs _____ 185—37 |
| 2,676,045 | 4/1954 | Moskovitz _____ 287—90 |

FOREIGN PATENTS

| | | |
|---|---|---|
| 145,457 | 2/1952 | Australia. |
| 612,239 | 7/1926 | France. |
| 1,200,402 | 6/1959 | France. |
| 632,157 | 11/1949 | Great Britain. |

CARL W. TOMLIN, *Primary Examiner.*

A. V. KUNDRAT, *Assistant Examiner.*